(12) United States Patent
Nakamura et al.

(10) Patent No.: US 9,685,844 B2
(45) Date of Patent: Jun. 20, 2017

(54) MOTOR AND METHOD OF MANUFACTURING MOTOR

(71) Applicant: NIDEC CORPORATION, Kyoto (JP)

(72) Inventors: Yoshinobu Nakamura, Kyoto (JP); Yoshiki Kawai, Kyoto (JP); Yusuke Makino, Kyoto (JP); Yosuke Yamada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 507 days.

(21) Appl. No.: 14/159,037

(22) Filed: Jan. 20, 2014

(65) Prior Publication Data
US 2014/0292124 A1    Oct. 2, 2014

(30) Foreign Application Priority Data

Mar. 29, 2013  (JP) ................. 2013-074119

(51) Int. Cl.
| | | |
|---|---|---|
| H02K 3/50 | (2006.01) | |
| H02K 3/52 | (2006.01) | |
| H02K 15/08 | (2006.01) | |
| H02K 15/02 | (2006.01) | |
| H02K 15/12 | (2006.01) | |

(52) U.S. Cl.
CPC .......... *H02K 15/026* (2013.01); *H02K 3/522* (2013.01); *H02K 3/52* (2013.01); *H02K 15/12* (2013.01); *H02K 2203/06* (2013.01); *H02K 2203/09* (2013.01); *H02K 2203/12* (2013.01); *Y10T 29/49009* (2015.01)

(58) Field of Classification Search
CPC .. H02K 15/026; H02K 3/522; H02K 2203/06; H02K 15/12; H02K 3/50; H02K 3/52; H02K 3/521; H02K 3/00; H02K 3/04; H02K 3/12; H02K 3/28; H02K 2203/09; H02K 2203/12; Y10T 29/49009

USPC .................... 310/194, 208, 71, 179
See application file for complete search history.

(56) References Cited

U.S. PATENT DOCUMENTS

2009/0256439 A1* 10/2009 Inoue .............. H02K 3/522
                                                      310/71

FOREIGN PATENT DOCUMENTS

| JP | 2000217293 A | * | 8/2000 |
| JP | 2007-259553 A | | 10/2007 |
| JP | 2008278704 A | * | 11/2008 |

OTHER PUBLICATIONS

JP 2008278704 A (English translation).*

(Continued)

*Primary Examiner* — Michael Andrews
*Assistant Examiner* — Alexander Moraza
(74) *Attorney, Agent, or Firm* — Cantor Colburn LLP

(57) ABSTRACT

A motor may include a stator having coil groups of plural phases and a connector, the stator comprising a plurality of split stators. Each of the split stators may include a split core having an arc-shaped core back section and a tooth section, an insulator, a coil which has a lead-out line that is connected to the connector. The insulator may have a first void extending between a first inner wall and a first outer wall. The first inner wall may have a lead-in groove. The stator may have a support ring disposed on the upper side of the first void. The support ring may have a second void extending between a second inner wall and a second outer wall. A plurality of lead-out lines of different phases may respectively accommodated in the first void and the second void.

7 Claims, 10 Drawing Sheets

(56) References Cited

OTHER PUBLICATIONS

JP 2000217293 A (English translation).*
JP 2008278704 A (English translation attached in last Office Action).*

* cited by examiner

MOTOR AND METHOD OF MANUFACTURING MOTOR

CROSS REFERENCE TO RELATED APPLICATION

The present invention claims priority under 35 U.S.C. §119 to Japanese Application No. 2013-074119 filed Mar. 29, 2013, the entire content of which is incorporated herein by reference.

TECHNICAL FIELD

The present invention relates to a motor and a method of manufacturing a motor.

BACKGROUND

In the past, in a case of forming a coil on each tooth section of an annular stator core, in order to prevent a nozzle of a winding machine from interfering with a coil formed on an adjacent tooth, it has been necessary to provide a predetermined gap between adjacent coils, and thus making it impossible to improve the space factor of the coil.

On the other hand, in order to improve the space factor of the coil, a method in which a split core is used is known. Since a coil is formed on each tooth section in a state where a stator core is divided, a concern that an adjacent coil and a nozzle of a winding machine may come into contact with each other is eliminated. As a result, since it is possible to reduce a gap that is provided between adjacent coils, it is possible to improve the space factor of the coil.

However, in a case where a coil is formed on a tooth of each split core, a lead-out line is led out from each coil. As a result, the work of connecting the lead-out line for each phase is required. This work becomes very complicated because insulation between the phases should also be secured while positioning and fixing the lead-out line.

In order to reduce this complexity, for example, there is a technique of reducing handling and connection of a conducting wire by connecting each lead-out line to a plate-shaped bus bar. However, if the bus bar is used, components increase.

Therefore, in a rotary electric machine of Japanese Unexamined Patent Application Publication No. 2000-217293, routing of a coil conducting wire by providing a first groove which is opened radially outward and extends in an axial direction and a second groove which is opened radially outward and extends in a circumferential direction is devised. The coil conducting wire is first led into the first groove from a coil end and subsequently led to a wire connection position on a coil end periphery determined for each phase, in the second groove which is different for each phase. By putting the coil conducting wire in the groove, fixation of the coil conducting wire in the work of treating an end portion becomes easy, and thus workability is improved. Further, since a separate groove is provided for each phase, securement of insulation between the phases becomes easy.

[Patent Document] Japanese Unexamined Patent Application Publication No. 2000-217293

However, in the rotary electric machine of Japanese Unexamined Patent Application Publication No. 2000-217293, the first groove is provided in order to prevent the conducting wires of different phases from crossing each other. However, since a plurality of second grooves is arranged in the axial direction, a concern that the coil conducting wire which is led into the groove on the lower side in the axial direction among the second grooves may cross the coil conducting wire of another phase increases. In order to reduce this concern, in the rotary electric machine of Japanese Unexamined Patent Application Publication No. 2000-217293, a hole penetrating a bottom portion of the first groove is provided.

By passing the coil conducting wire through the hole, a distance in which the coil conducting wire is led into the first groove and then led to the second groove is shortened. For this reason, a concern that the coil conducting wire which is led and the coil conducting wire of another phase may cross each other is reduced. Further, by passing the coil conducting wire through the hole, movement of the coil conducting wire is suppressed from the hole. In this way, a concern that the coil conducting wire may come into contact with another member due to vibration, causing dielectric breakdown, is also reduced.

However, the work of passing the coil conducting wire through the hole is a very difficult process. Further, there is a concern that a leading end of the coil conducting wire may be damaged when passing the coil conducting wire through the hole.

SUMMARY

At least an embodiment of this application relates to a motor having a rotor and a stator. The rotor is supported so as to be able to rotate around an axis of rotation. The stator is formed into a cylindrical shape by connecting a plurality of split stators. Further, the stator has coil groups of plural phases and a connector. The split stator has a core back section, a tooth section, an insulator, and a coil. The core back sections have an arc shape and are connected to each other. The tooth section extends toward the inside in a radial direction from the core back section. The insulator covers the tooth section and at least a portion of the core back section. The coil has a lead-out line that is connected to the connector, and is formed by being wound around the tooth section with the insulator interposed therebetween. The insulator has a first inner wall, a first outer wall, and a first void. The first inner wall extends in a circumferential direction at a portion which covers the upper surface in an axial direction of the core back section. The first outer wall is disposed further to the outside in the radial direction than the first inner wall and extends in the circumferential direction. The first void extends in the circumferential direction between the first inner wall and the first outer wall. The first inner wall has a lead-in groove recessed toward the lower side in the axial direction at the upper surface in the axial direction. The stator further has a support ring which is disposed on the upper side in the axial direction of the first void. The support ring has a bottom portion, a second inner wall, a second outer wall, and a second void. The bottom portion extends in the circumferential direction. The second inner wall extends in the circumferential direction on the upper surface in the axial direction of the bottom portion. The second outer wall is disposed further to the outside in the radial direction than the second inner wall and extends in the circumferential direction. The second void extends in the circumferential direction between the second inner wall and the second outer wall. A plurality of lead-out lines of different phases is respectively accommodated in the first void and the second void. The lead-out line which is accommodated in the first void is accommodated in the first void through the lead-in groove from the coil. The distance between the bottom portion of the support ring and the first inner wall is smaller than the wire diameter of the lead-out line.

According to at least an embodiment of this application, it is possible to easily accommodate the lead-out line in each void while securing insulation between the phases in the lead-out lines.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
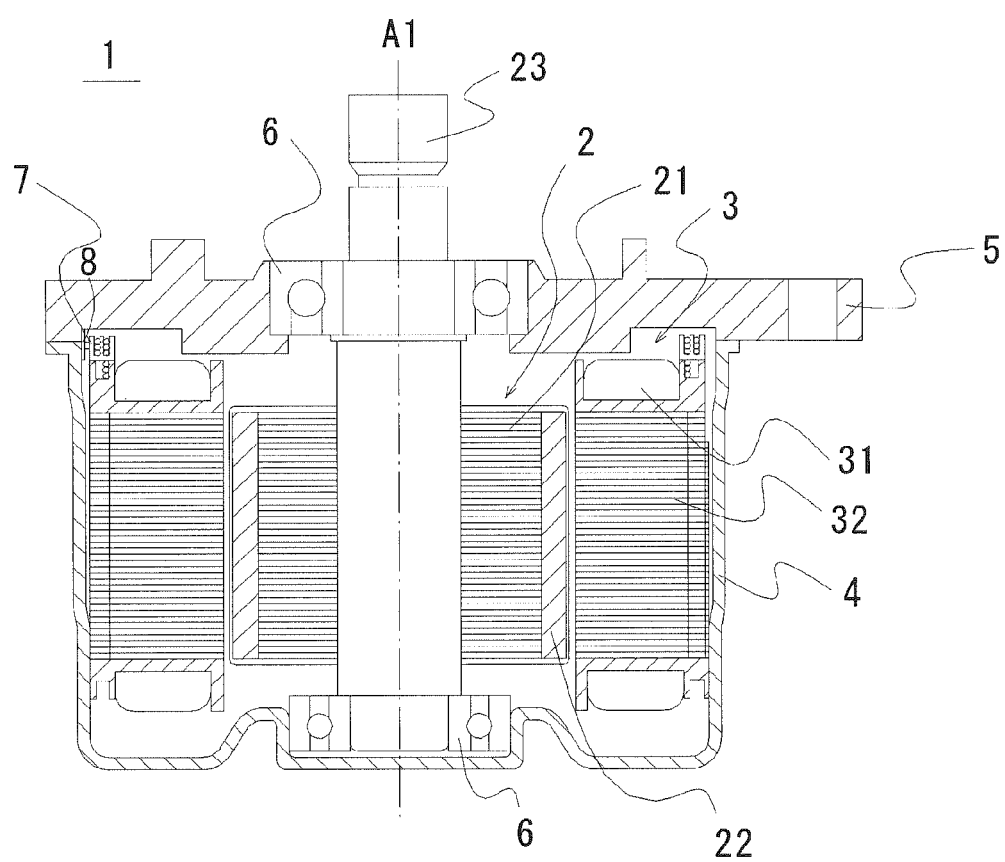
FIG. 1 is a vertical cross-sectional view of a motor according to at least an embodiment.

Hereinafter, an exemplary embodiment will be described referring to the drawings. In addition, in this application, a direction parallel to the central axis of a rotor is referred to as an "axial direction", a direction perpendicular to the central axis of the rotor is referred to as a "radial direction", and direction along an arc centered on the central axis of the rotor is referred to as a "circumferential direction". Further, in this application, the shape or the positional relationship of each section will be described with the axial direction set to be the up-and-down direction. However, the definition of the up-and-down direction is not intended to limit a direction when using a motor according to the invention.

FIG. 1 is a vertical cross-sectional view of a motor 1 according to an exemplary embodiment. The motor 1 is mounted on a vehicle as, for example, a motor for driving.

Figure 10:
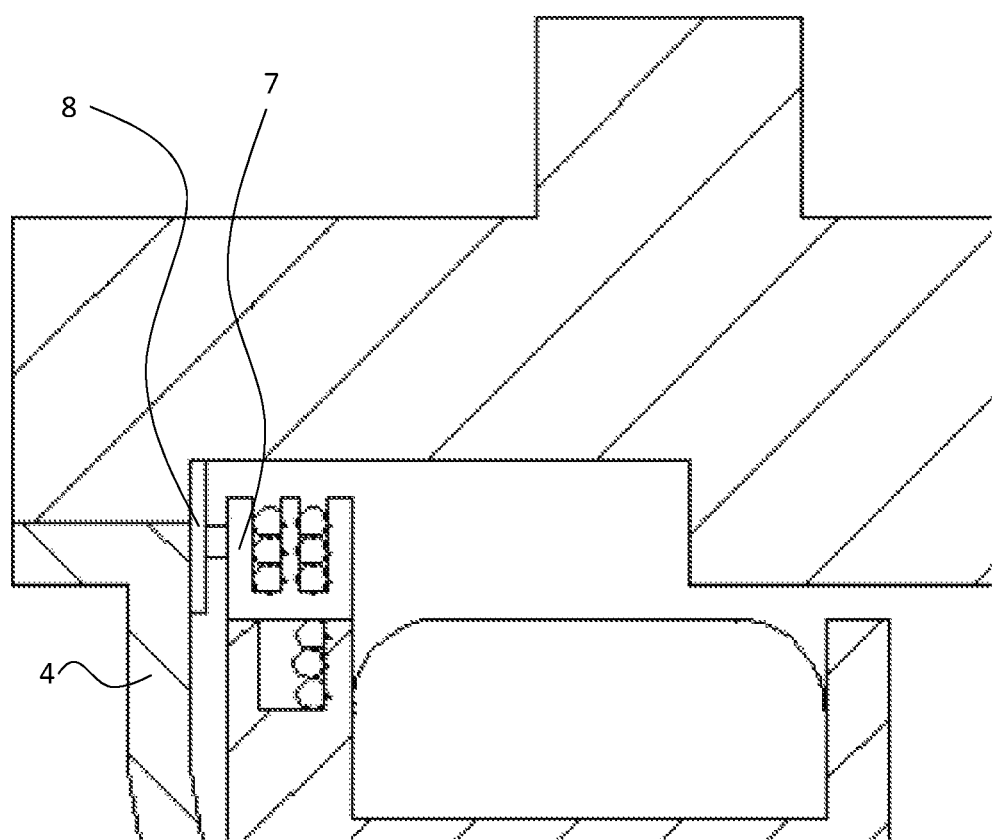
FIG. 10 is a magnified view of the portion of FIG. 1 showing the connector.

As shown in FIG. 1, the motor 1 includes a rotor 2, a stator 3, a housing 4, a bracket 5, a bearing 6, a support ring 7, and a connector 8 (see also FIG. 10, which shows a magnified view of the portion of FIG. 1 showing the connector). The rotor 2 has a rotor core 21, a magnet 22, and a shaft 23. The shaft 23 extends in the axial direction. The rotor core 21 is fixed to the shaft 23. The magnet 22 is fixed to the rotor core 21. The stator 3 faces the rotor 2 in the radial direction and is fixed to the housing 4. The housing 4 has an opening on the upper side in the axial direction and the bracket 5 blocks the opening. The housing 4 and the bracket 5 respectively support the bearings 6. The bearings 6 support the shaft 23. The bearings 6 support the shaft 23, whereby the rotor 2 is supported so as to be able to rotate around an axis of rotation A1. Although not specifically shown in the drawing, the connector 8 is electrically connected to the stator 3 and disposed at a position connected to an external power supply or the like.

The stator 3 is formed into a cylindrical shape by connecting a plurality of split stators 32 and has coil groups 31 of plural phases.

Figure 2:
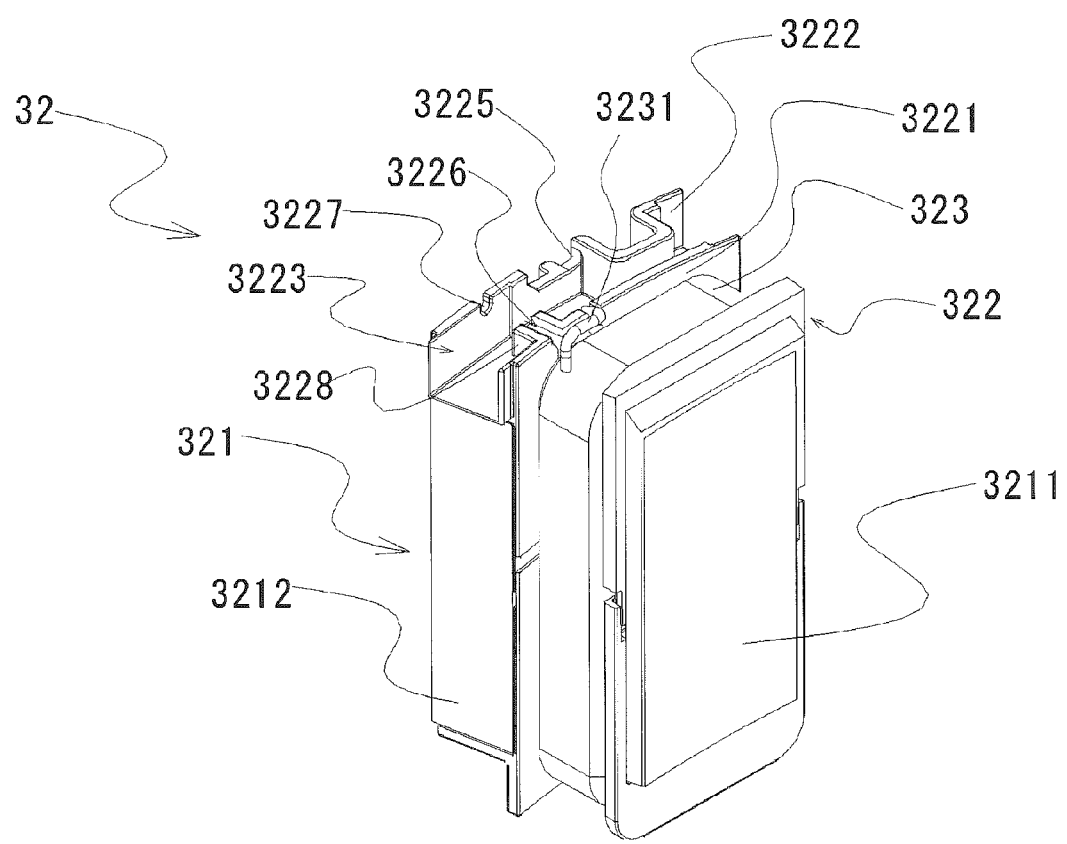
FIG. 2 is a perspective view of a U-phase split stator in the embodiment.

As shown in FIG. 2, the split stator 32 has a split core 321, an insulator 322, and a coil 323. A U-phase coil 323 is formed on the split stator 32 shown in FIG. 2. From here, the configuration of the split stator 32 will be described using an example of a U-phase split stator 32.

The split core 321 has a core back section 3212 and a tooth section 3211. The core back sections 3212 each have an arc shape and are connected to each other. The tooth section 3211 extends further toward the inside in the radial direction than the core back section 3212.

The insulator 322 covers the tooth section 3211 and a portion of the core back section 3212.

The coil 323 is formed by being wound around the tooth section 3211 with the insulator 322 interposed therebetween. Further, the coil 323 has a U-phase lead-out line 3231.

The insulator 322 has a first inner wall 3221, a first outer wall 3222, and a first void 3223 at the portion which covers the upper surface in the axial direction of the core back section. The first inner wall 3221 extends in the circumferential direction further on the outside in the radial direction than the coil 323. The first outer wall 3222 extends in the circumferential direction further on the outside in the radial direction than the first inner wall 3221. The first void 3223 extends in the circumferential direction between the first inner wall 3221 and the first outer wall 3222. When the respective split stators 32 are connected, whereby the stator 3 having a cylindrical shape is formed, the first voids 3223 are connected to each other, thereby forming an annular void.

Figure 3:
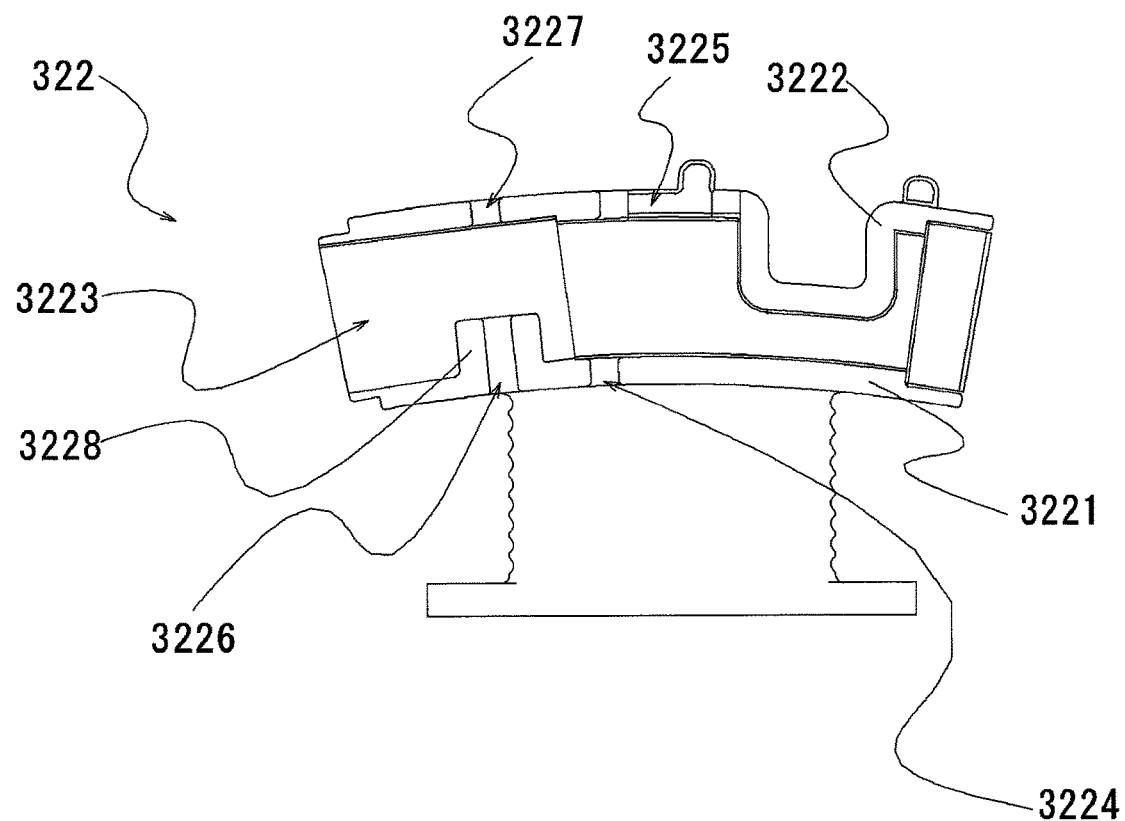
FIG. 3 is a top view of an insulator in the embodiment.

As shown in FIG. 3, the first inner wall 3221 has, at the upper surface in the axial direction, a first lead-in groove 3224 and a second lead-in groove 3226, which are recessed toward the lower side in the axial direction. The U-phase lead-out line 3231 is accommodated in the first void 3223 through the first lead-in groove 3224 from the coil 323. After the respective split stators 32 are connected, the first void 3223 is filled with resin 9. Further, the first inner wall 3221 has a protrusion portion 3228 which protrudes toward the outside in the radial direction, at a site in which the first lead-in groove 3224 is not present. The second lead-in groove 3226 is provided in the upper surface of the protrusion portion 3228. Further, the dimension between the protrusion portion 3228 and the first outer wall 3222 is larger than the wire diameter of the U-phase lead-out line 3231.

The first outer wall 3222 has, at the upper surface in the axial direction, a first lead-out groove 3225 and a second lead-out groove 3227, which are recessed toward the lower side in the axial direction. After the U-phase lead-out line 3231 is accommodated in the first void 3223, the U-phase lead-out line 3231 passes the annularly connected first void 3223 and is then led out radially outward from the first void 3223 through the first lead-out groove 3225 of the split stator 32 closest to the connector 8. After the U-phase lead-out line 3231 is introduced into the annular first void 3223, the U-phase lead-out line 3231 is tensioned toward the inside in the radial direction, thereby being in contact with the radially outer surface of the first inner wall 3221, until it approaches the first lead-out groove 3225. Further, the U-phase lead-out line 3231 passes under the protrusion portion 3228.

A portion of the core back section 3212 is not covered by the insulator 322. The first outer wall 3222 extends so as to form the boundary between the portion of the core back section 3212 which is not covered by the insulator 322, and the first void 3223.

Figure 4:
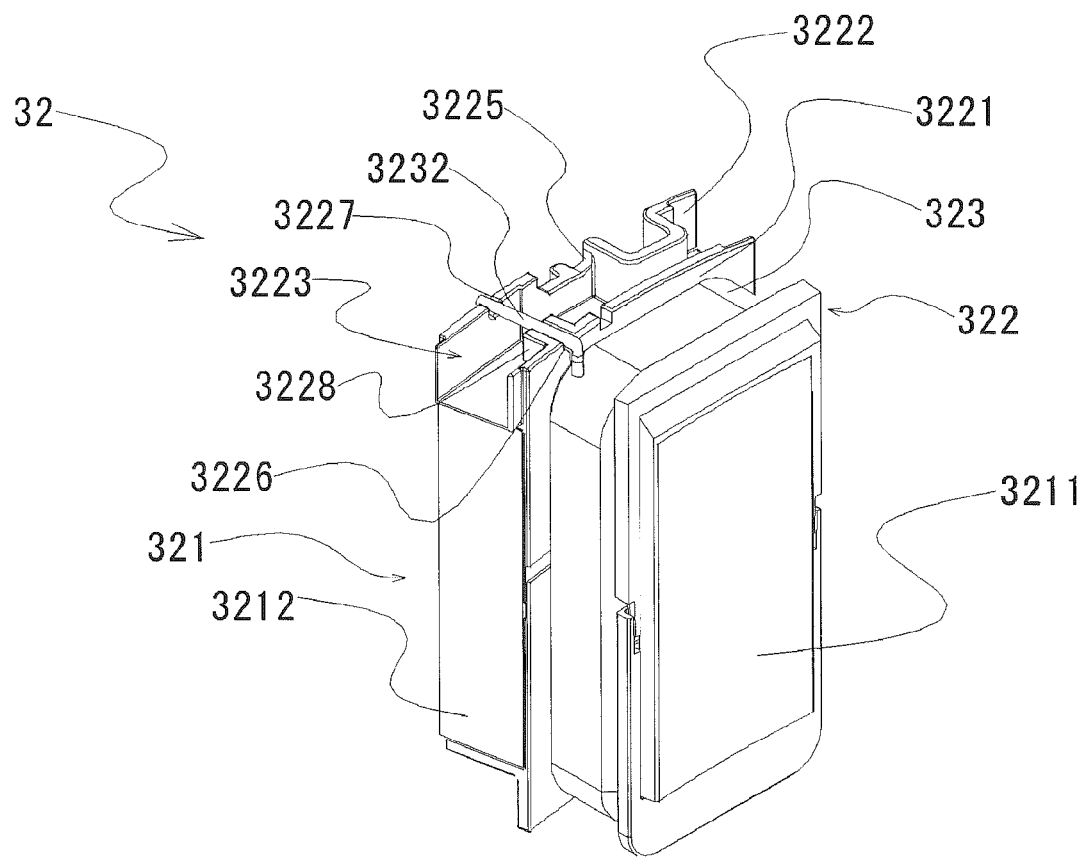
FIG. 4 is a perspective view of the U-phase split stator in the embodiment.

A V-phase coil 323 is formed on the split stator 32 shown in FIG. 4. From hereon, the configuration of a V-phase split stator 32 will be described. However, with respect to the same configuration as that of the U-phase split stator, description is omitted.

In the V-phase split stator 32, the coil 323 has a V-phase lead-out line 3232. The V-phase lead-out line 3232 directly passes over from the second lead-in groove 3226 to the second lead-out groove 3227.

As shown in FIG. 1, the stator 3 further has the support ring 7. The support ring 7 is disposed on the upper side in the axial direction of the first void 3223.

Figure 5:
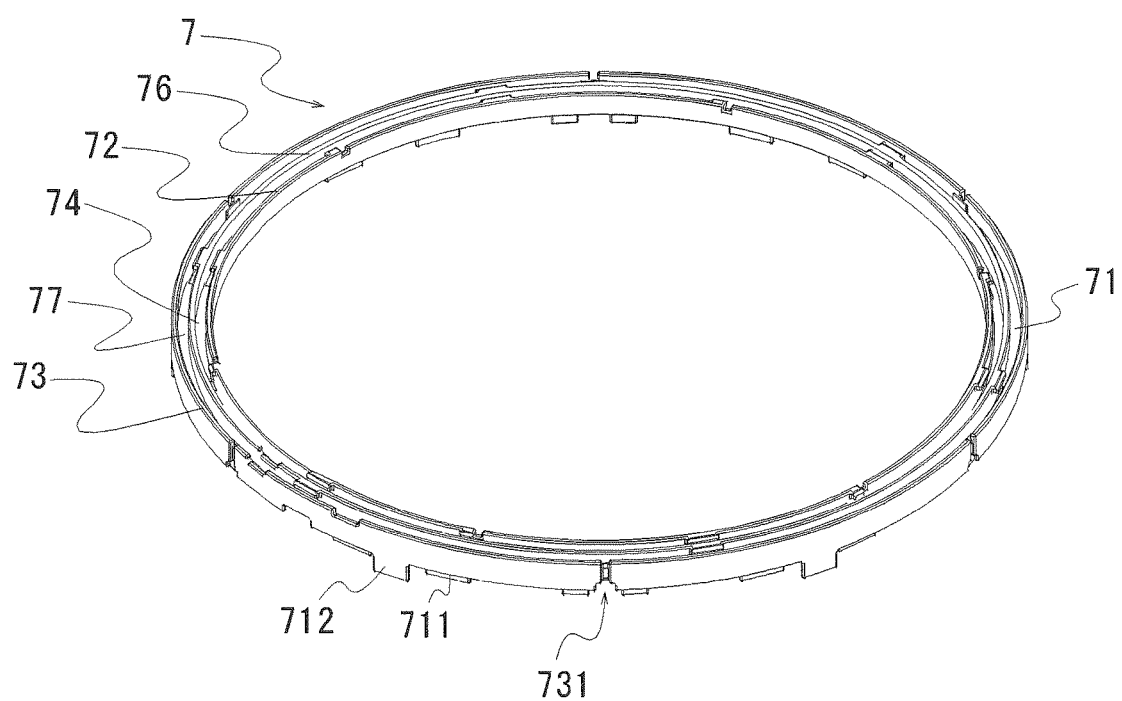
FIG. 5 is a perspective view of a support ring in the embodiment.

As shown in FIG. 5, the support ring 7 has a bottom portion 71, a second inner wall 72, a second outer wall 73, a second void 74, an intermediate wall 76, and a third void 77.

The second inner wall 72 is a wall which rises in the axial direction from the upper surface of the bottom portion 71 at the radially inner side of the bottom portion 71, and extends in the circumferential direction. The intermediate wall 76 is a wall which rises in the axial direction from the upper surface of the bottom portion 71 further on the outside in the radial direction than the second inner wall 72, and extends in the circumferential direction. The second outer wall 73 is a wall which rises in the axial direction from the upper surface of the bottom portion 71 further on the outside in the radial direction than the intermediate wall 76, and extends in the circumferential direction. The second void extends in the circumferential direction between the second inner wall 72 and the intermediate wall 76. The third void 77 extends in the circumferential direction between the intermediate wall 76 and the second outer wall 73. The second void 74 and the third void 77 are filled with the resin 9 after a lead-out line of each phase (described later) is accommodated therein. In addition, in this exemplary embodiment, a three-phase motor is described. However, for example, if it is a two-phase motor, it is acceptable if the second void 74 is provided between the second inner wall 72 and the second outer wall 73 and a lead-out line is accommodated therein.

Further, the bottom portion 71 has a leg portion 711 and a positioning portion 712. The leg portion 711 extends in the circumferential direction from the lower surface of the bottom portion. The positioning portion 712 extends in the circumferential direction from the lower surface of the bottom portion 71 further on the outside in the radial direction than the leg portion 711.

The second outer wall 73 has an outer groove 731 recessed toward the inside in the radial direction, at the radially outer surface. The vicinity of the outer groove 731 in the upper surface in the axial direction of the second outer wall 73 is recessed in the axial direction further than another portion of the second outer wall 73.

Figure 6:
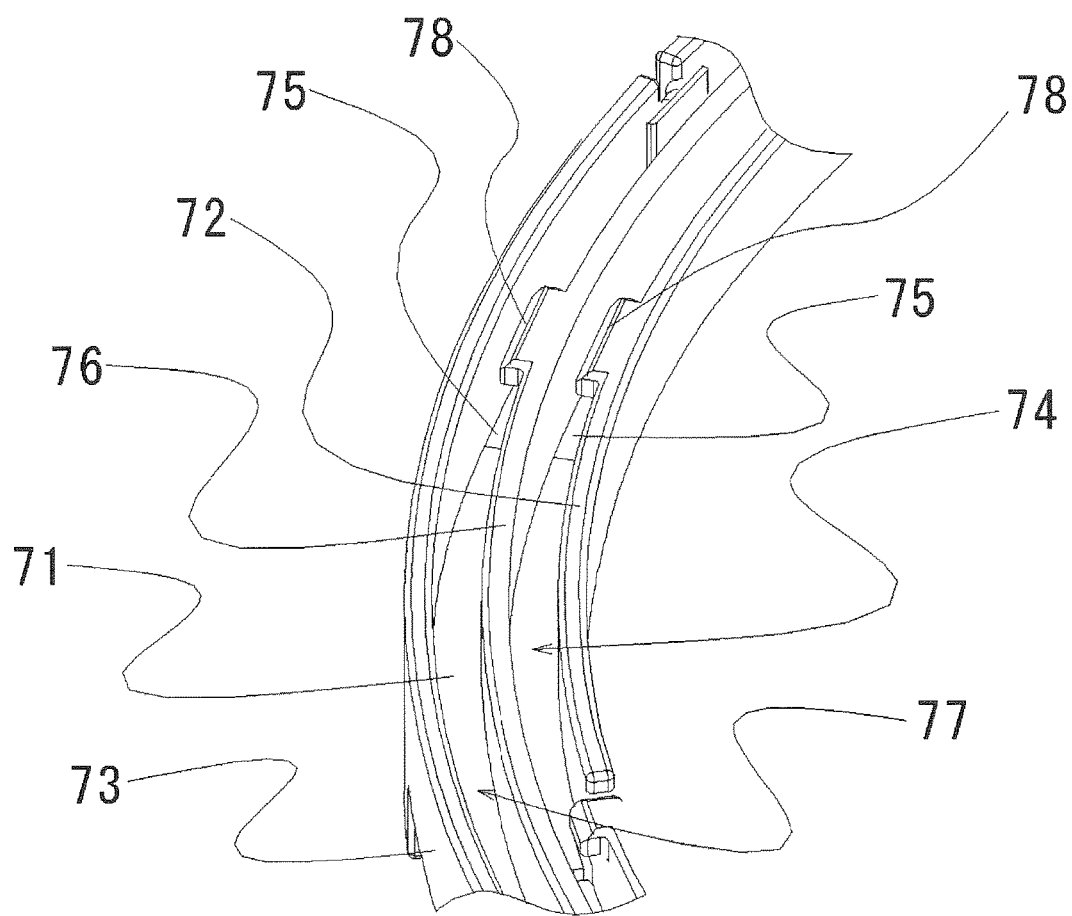
FIG. 6 is a partially enlarged perspective view of the support ring in the embodiment.

As shown in FIG. 6, a through-hole 75 is formed in the bottom portion 71. The through-hole 75 is disposed on the upper side in the axial direction of the first void 3223. The second inner wall 72 has a pressing portion 78 which protrudes radially outward at the upper side in the axial direction of the through-hole 75. Further, the intermediate wall 76 also likewise has the pressing portion 78 which protrudes radially outward at the upper side in the axial direction of the through-hole 75. A gap which is smaller than the wire diameter of the lead-out line is present between the pressing portion 78 and the wall portion that faces it.

Further, the distance between the bottom portion 71 and the first inner wall 3221 is smaller than the wire diameter of the U-phase lead-out line 3231.

Figure 7:
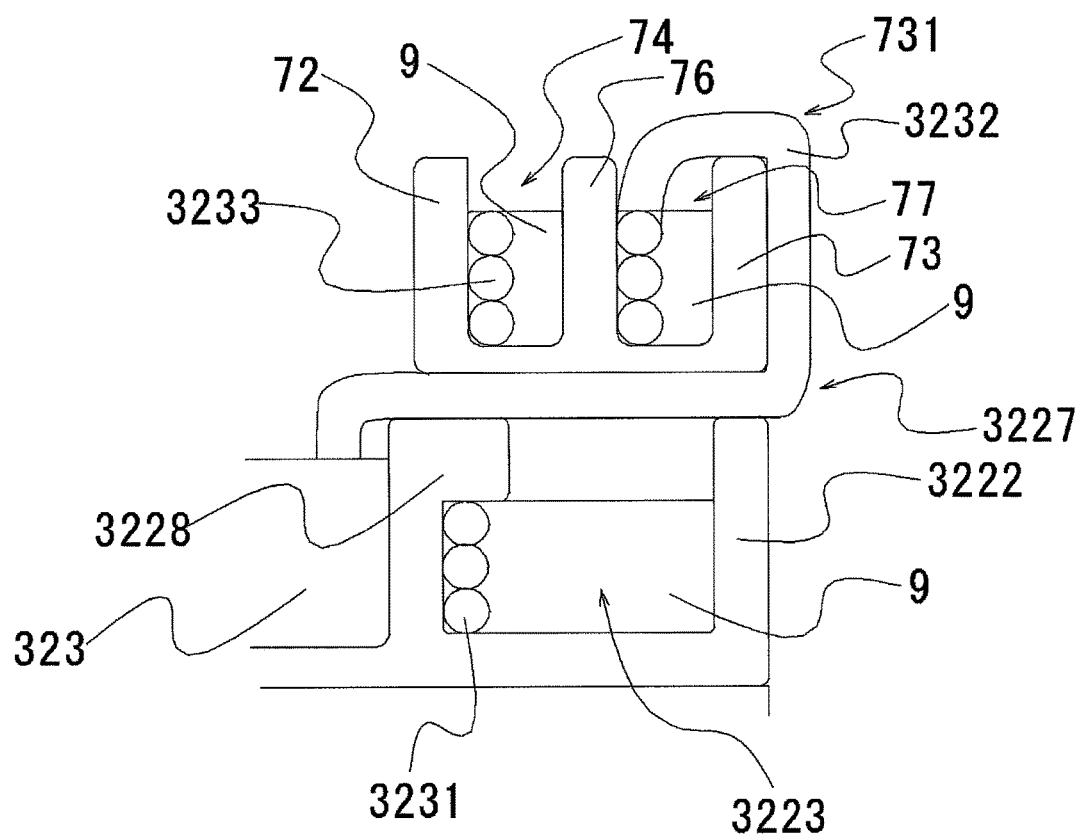
FIG. 7 is a partially enlarged cross-sectional view of a stator in the embodiment.

As shown in FIG. 7, the V-phase lead-out line 3232 is lead out from the first void 3223 and then accommodated in the third void 77 through the outer groove 731.

Further, a W-phase lead-out line 3233 (not shown) is led out from the coil 323 and then directly accommodated in the second void 74 from the inside in the radial direction.

Figure 8:
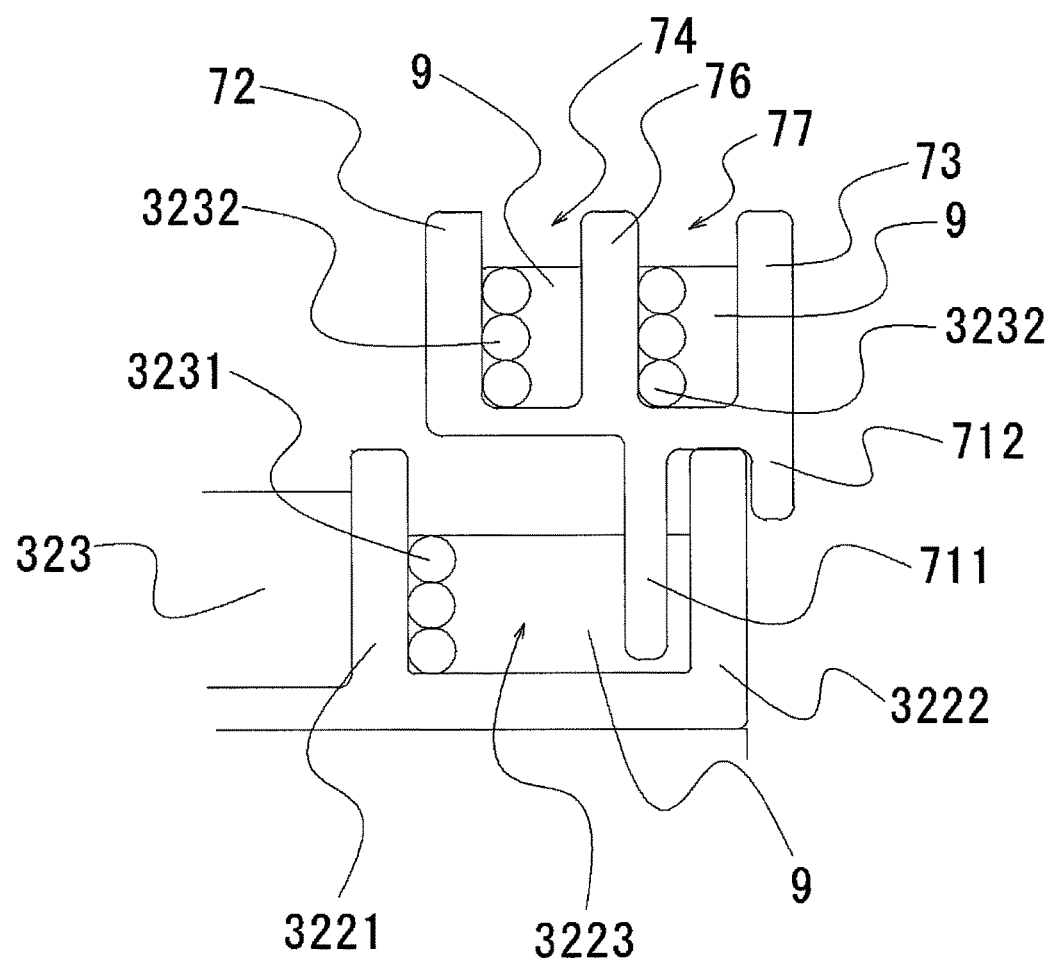
FIG. 8 is a partially enlarged cross-sectional view of the stator in the embodiment.

As shown in FIG. 8, the leg portion 711 is immersed in the resin 9. Further, the upper surface of the first outer wall 3222 comes into contact with the lower surface of the bottom portion 71 and the first outer wall 3222 is disposed between the leg portion 711 and the positioning portion 712.

The motor 1 according to this exemplary embodiment has the configuration described above, and next, a process of assembling the stator 3 while assembling the motor 1 will be described.

First, the insulator 322 is mounted on the U-phase split core 321 and the coil 323 is formed by being wound around the tooth section 3211 with the insulator 322 interposed therebetween. Thereafter, the U-phase lead-out line 3231 led out from the coil 323 is accommodated in the first void 3223 through the first lead-in groove 3224. Next, the coil 323 is formed on the V-phase split core 321, similar to the U-phase, and the V-phase lead-out line 3231 led out from the coil 323 is accommodated in the first void 3223 through the second lead-in groove 3226 and then led out to the outside in the radial direction than the first void 3223 through the second lead-out groove 3227. Further, the coil 323 is formed on the W-phase split core 321, similar to other phases. However, the order for forming the split stators 32 of the respective phases is not limited thereto.

After the coil 323 is formed on the split stator 32 of each phase, the respective split cores are connected, thereby forming a cylindrical stator. Thereafter, the U-phase lead-out line 3231 passes the first void 3223 and is then led out radially outward from the first lead-out groove 3225 of the split stator 32 closest to the connector 8.

Next, the resin 9 is filled in the annularly connected first void 3223. Before the resin 9 is cured, the support ring is disposed on the upper side in the axial direction of the first void 3223 such that the leg portion 711 is immersed in the resin 9.

In this state, the V-phase lead-out line 3232 is accommodated in the third void 77 through the outer groove 731. Further, the W-phase lead-out line 3233 is directly accommodated in the second void 74 from the inside in the radial direction. Thereafter, the second void 74 and the third void 77 are filled with the resin 9 and the resin 9 is cured. In this way, the stator 3 of this embodiment is manufactured.

As described above, according to the motor 1 related to this embodiment, since it is possible to dispose the support ring after the U-phase lead-out line 3231 passes through the first lead-in groove 3224, it is possible to easily accommodate the U-phase lead-out line 3231 in the first void 3223. Further, since the distance the bottom portion 71 and the first inner wall 3221 is smaller than the wire diameter of the U-phase lead-out line 3231, it is possible to suppress movement of the U-phase lead-out line at the lead-in groove 3224 and the bottom portion 71. Further, since the distance the bottom portion 71 and the first inner wall 3221 is smaller than the wire diameter of the U-phase lead-out line 3231, it is possible to prevent the U-phase lead-out line 3231 from jumping out of the first void 3223 until the resin 9 in the first void 3223 is cured, and therefore, the U-phase lead-out line 32231 can be prevented from being damaged.

Further, since the through-hole 75 is disposed on the upper side in the axial direction of the first void 3223, even in a case where the resin 9 filled in the second void 74 leaks from the through-hole 75, it is possible to accommodate the U-phase lead-out line 3231 in the first void 3223. For this reason, it is possible to prevent resin stuck to an unintended place from peeling off due to vibration or the like, thereby causing a defect.

Further, the second inner wall 72 has the pressing portion 78 which protrudes radially outward at the upper side in the axial direction of the through-hole 75. Further, the intermediate wall 76 also likewise has the pressing portion 78 which protrudes radially outward at the upper side in the axial direction of the through-hole 75. A gap which is smaller than the wire diameter of the lead-out line is present between the pressing portion 78 and the wall portion which faces it. For this reason, it is possible to prevent a lead-out line accommodated in a void from jumping out of a void. Further, since there is the through-hole 75, it is possible to mold a shape having a narrow width by a simple mold.

Figure 9:
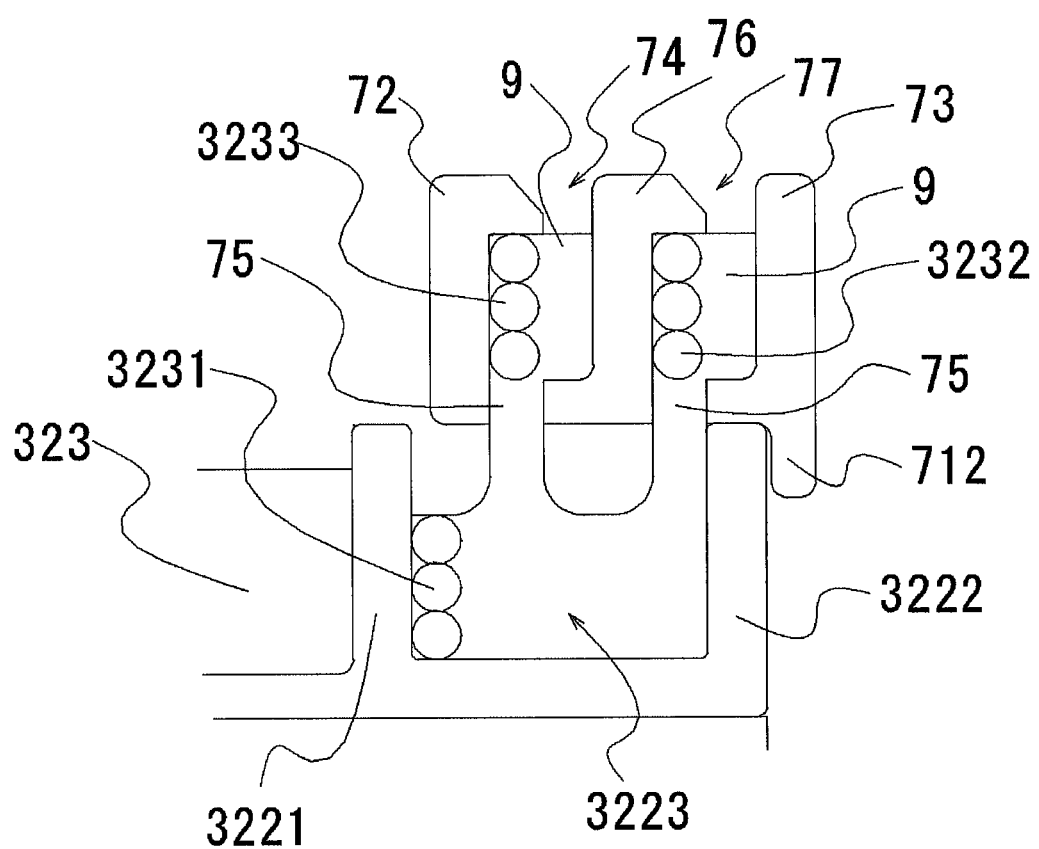
FIG. 9 is a partially enlarged cross-sectional view of the stator in the embodiment.

Further, as described above, the through-hole 75 is disposed on the upper side in the axial direction of the first void 3223. For this reason, as shown in FIG. 9, the resin 9 filled in the second void 74 and the third void 77 and the resin 9 filled in the first void 3223 are connected. For this reason, the rotation of the support ring 7 with respect to the stator 3 is prevented.

Further, the support ring 7 has the leg portion 711 which extends axially downward from the lower surface of the bottom portion 71, and the leg portion 711 is disposed in the first void 3223 and immersed in resin. For this reason, the support ring 7 is fixed solidly with respect to the stator 3.

Further, the U-phase lead-out line 3231 is led out to the outside in the radial direction through the first lead-out groove 3225, and at least a portion of an opening on the upper side in the axial direction of the first lead-out groove 3225 is covered by the lower surface of the support ring. For this reason, movement of the U-phase lead-out line 3231 is suppressed in the vicinity of the first lead-out groove 3225, and thus damage to the U-phase lead-out line 3231 can be suppressed.

Further, the V-phase lead-out line 3232 passes through the second lead-in groove 3226 and the second lead-out groove 3227 and is led out to the outside in the radial direction of the first void 3223. As a result, the V-phase lead-out line 3232 is disposed between the second lead-in groove 3226 and the lower surface of the support ring 7 and between the second lead-out groove 3227 and the support ring 7 in the first void 3223. For this reason, movement of the V-phase lead-out line 3232 is suppressed, and thus damage to the V-phase lead-out line 3232 can be suppressed.

In addition, since the V-phase lead-out line 3232 is accommodated in the third void 77 from the outside in the radial direction and the W-phase lead-out line 3233 is accommodated in the second void 74 from the inside in the radial direction, a structure is made in which the V-phase lead-out line 3232 and the third void 77 do not cross each other. For this reason, each lead-out line can be easily accommodated in each void, and thus it is possible to obtain high reliability.

In addition, the first inner wall 3221 has the protrusion portion 3228 which protrudes toward the outside in the radial direction, at a site in which the first lead-in groove 3224 is not present. Further, the U-phase lead-out line 3231 passes the lower side in the axial direction of the protrusion portion 3228. For this reason, contact of the U-phase lead-out line 3231 and the V-phase lead-out line 3232 in the first void 3223 is suppressed.

Further, a gap that is larger than the wire diameter of the U-phase lead-out line 3231 is present between the protrusion portion 3228 and the first outer wall 3222. For this reason, since it is possible to dispose the U-phase lead-out line 3231 below the protrusion portion 3228 through the gap, it becomes easy to dispose the U-phase lead-out line 3231 below the protrusion portion 3228.

Further, since the V-phase lead-out line 3232 led out from the second lead-out groove 3227 is accommodated in the third void 77 through the outer groove 731 recessed in the radial direction, the V-phase lead-out line 3232 can be prevented from protruding further to the outside in the radial direction than the support ring 7.

Further, since the circumferential positions of the second lead-in groove 3226 and the second lead-out groove 3227 are the same, it becomes easy to dispose the V-phase lead-out line in each groove.

Further, since the first outer wall 3222 is disposed between the leg portion 711 and the positioning portion 712, the positioning in the radial direction of the support ring becomes easy.

Further, the first outer wall 3222 extends so as to form the boundary between the portion of the core back section 3212 which is not covered by the insulator 322, and the first void 3223. As a result, the distance between the first outer wall 3222 and the first inner wall 3221 becomes small. For this reason, movement of the U-phase lead-out line 3231 accommodated in the first void 3223 can be suppressed.

The exemplary embodiment has been described above. However, the invention is not limited to the above-described embodiment. For example, in the exemplary embodiment described above, a configuration has been described in which the U-phase lead-out line is accommodated in the first void, the V-phase lead-out line is accommodated in the third void, and the W-phase lead-out line is accommodated in the second void. However, there is no particular limitation to this combination, and which lead-out line is accommodated in which void can be freely changed.

At least an embodiment of the invention can be used in a motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:
1. A motor comprising:
   a rotor that is supported so as to be able to rotate around an axis of rotation; and
   a stator that is formed into a cylindrical shape and having coil groups of plural phases and a connector, the stator comprising a plurality of split stators,
   wherein each of the split stators comprises:
   a split core having an arc-shaped core back section configured to connect with an arc-shaped core back section of another split core and a tooth section which extends toward the inside in a radial direction from the core back section, an insulator which covers the tooth section and at least a portion of the core back section, a coil which has a lead-out line that is connected to the connector, and is wound around the tooth section with the insulator interposed therebetween, and wherein the insulator has, at a portion which covers an upper surface in an axial direction of the core back section, a first inner wall which extends in a circumferential direction, a first outer wall which is disposed further to the outside in the radial direction than the first inner wall and extends in the circumferential direction, and a first void which extends in the circumferential direction between the first inner wall and the first outer wall, the first inner wall has a lead-in groove recessed toward the lower side in the axial direction, at an upper surface in the axial direction, the stator further has a support ring which is disposed on the upper side in the axial direction of the first void, the support ring has a bottom portion which extends in the circumferential direction, a second inner wall which extends in the circumferential direction on an upper surface in the axial direction of the bottom portion, a second outer wall which is disposed further to the outside in the radial direction than the second inner wall and extends in the circumferential direction, and a second void which extends in the circumferential direction between the second inner wall and the second outer wall, a plurality of lead-out lines of different phases is respectively accommodated in the first void and the second void, the lead-out line which is accommodated in the first void is accommodated in the first void through the lead-in groove from the coil;

a distance between an inner edge of the bottom portion and the first inner wall is smaller than a wire diameter of the lead-out line;

wherein the support ring has an intermediate wall between the second outer wall and the second inner wall and further on the outside in the radial direction than the second void, and a third void which extends in the circumferential direction between the intermediate wall and the second outer wall, the lead-out line of a phase different from phases of the lead-out lines accommodated in the first void and the second void passes through the lead-in groove and the lead-out groove, is led out further to the outside in the radial direction than the first void along an outside of the second outer wall, and then accommodated in the third void from the outside in the radial direction; and the lead-out line which is accommodated in the second void is provided along the second inner wall of the support ring.

2. The motor according to claim 1, wherein the first void is filled with resin.

3. The motor according to claim 1, wherein the first outer wall has a lead-out groove recessed toward the lower side in the axial direction, at an upper surface in the axial direction, the lead-out line which is accommodated in the first void is discharged to the outside in the radial direction through the lead-out groove, and at least a portion of an opening on the upper side in the axial direction of the lead-out groove is covered by a lower surface of the bottom portion.

4. The motor according to claim 1, wherein the first inner wall has a protrusion portion which protrudes toward the outside in the radial direction in the vicinity of the lead-in groove, and the lead-out line which is accommodated in the first void is disposed on the lower side in the axial direction of the protrusion portion.

5. The motor according to claim 4, wherein a gap that is larger than a wire diameter of the lead-out line is present between the protrusion portion and the first outer wall.

6. The motor according to claim 4, wherein the second outer wall has an outer groove recessed toward the inside in the radial direction, at an outer surface in the radial direction, and the lead-out line which is accommodated in the third void enters the third void through the outer groove.

7. The motor according to claim 6, wherein a circumferential position of the outer groove is the same as a circumferential position of the lead-out groove.

* * * * *